April 12, 1932.                  W. N. GILBERT                    1,853,206
                                     SCALE
                              Filed Oct. 31, 1927
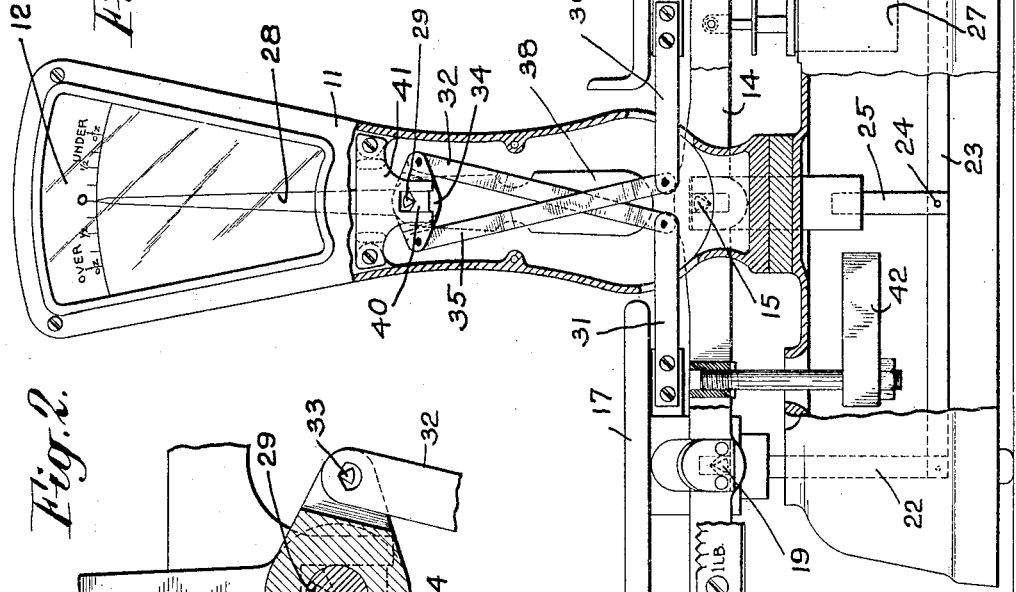
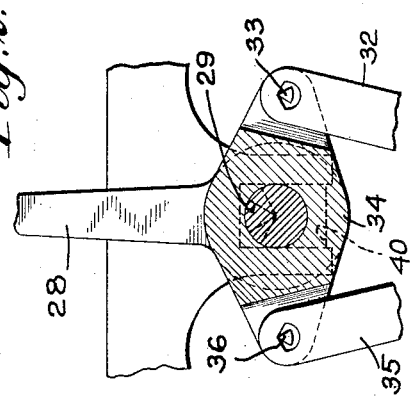
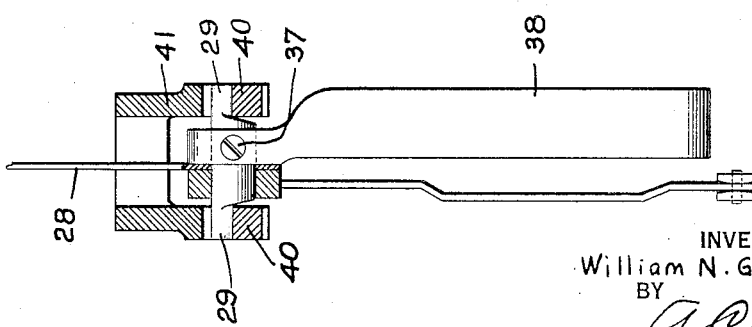
INVENTOR
William N. Gilbert
BY
ATTORNEY Patented Apr. 12, 1932

1,853,206

UNITED STATES PATENT OFFICE

WILLIAM N. GILBERT, OF HUDSON HEIGHTS, NEW JERSEY, ASSIGNOR TO DAYTON SCALE COMPANY, OF DAYTON, OHIO, A CORPORATION OF NEW JERSEY

SCALE

Application filed October 31, 1927. Serial No. 229,923.

This invention concerns a scale of the even balance type in which an indicator with multiplying connections is provided to assist in recognizing the balance condition of the scale beam.

The invention also concerns a scale of the even balance type in which tilting of the scale base will affect neither the accuracy of the balancing operation nor the accuracy of the indicator.

The principal object of the invention is to provide a scale of this type in which improved and simplified multiplying connections are provided intermediate the scale beam and the indicator.

Another object of the invention is to provide a scale of this type in which improved and novel means are provided to insure accuracy of weighing when the scale is out of level.

Another object of the invention is to provide a scale of this type in which improved and accurate means are provided to indicate the amounts of over and under weights when the scale beam is out of balance.

Another object of the invention is to realize the above objects without the use of springs.

Still another object of the invention is to provide an even balance scale wherein the indicator is held in its zero or neutral position by means of balancing pendulums.

A further object of the invention is to provide an even balance scale having pendulum load offsetting mechanism to offset the excess weight when the pendulum is in exactly balance position.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the accompanying drawings I have shown for the purpose of illustration one form of mechanism embodying the invention in which Fig. 1 is a front elevation of the scale with certain parts shown in section.

Fig. 2 is an enlarged sectional view of the means for actuating the indicator.

Fig. 3 is a section at right angles to Fig. 2 showing a side view of the pendulum and manner in which the pendulum and indicator are mounted.

The preferred form of the invention contemplates an even balance scale in which an indicator is mounted on a frictionless bearing to coact with a chart or index and is connected to the scale beam by simple mulitiplying links and levers. A pendulum is associated with the lever to hold it on zero when the scale base is level. This pendulum tends to move the indicator off zero when the scale base is tilted and a second pendulum which may be associated with the scale beam is provided to balance the first one and hold the indicator on zero when the scale base is tilted. Incidentally the two pendulums form an auxiliary load offsetting mechanism by which slight amounts of over and under weights may be accurately indicated.

Referring more particularly to Fig. 1, the scale includes a support or base 10, a casing 11, a chart or index 12, and a beam 14 pivotally supported on the base of the scale by means of the knife edges 15. This beam, as is customary in scales of the even balance type carries at one end a weighing plate or pan 16 and at its opposite end a similar pan 17 for the well known counter weights to bring the beam 14 in balance when a commodity to be weighed has been placed on the pan 16. These two pans are mounted on the beam in the well known manner on knife edges 18 and 19 and carry downwardly projecting stems 21 and 22 which are pivoted to a check rod 23. The check rod 23 is in turn pivoted at 24 to an arm 25 fixed to a support on base of the scale. The above check rod is provided to retain the pans 16 and 17 in parallel positions at all times. The beam 14 is provided with the usual tare beam and adjustable tare poise 26 and also with the usual dash pot 27 for damping the oscillations of the beam.

An indicator 28 cooperating with chart 12 is fixed to a member 34 which is fulcrumed through knife edges 29 on bearings 40 supported by the scale casing. The member 34 is connected by links 32 and 35 to arms 31 and 30 fixed to the pans 17 and 16 respectively. The links 32 and 35 are crossed for a reason which will appear later and on movement of the scale beam 14 serve to move the indicator 28 according to the movement of the beam but with a multiplied motion to assist in determining the balance position of the beam. A pendulum 38 is fixed to the member 34 tending to hold the pointer on zero as long as the scale base is level. When the scale base is tilted the pendulum 38 tends to move the indicator off zero and incidentally hold the scale beam horizontal. To overcome this effect a second pendulum 42 is associated with the scale beam. This pendulum comprises a weight located well below the level of the beam knife edges and balanced by the weight of those parts of the dash pot 27 which are mounted on the beam and by additional weight placed in the shot box on the opposite arm of the beam. This provides an effective center of mass directly below the fulcrum point 15 of the beam. Owing to the crossed links 32 and 35 the forces applied to the beam by the action of pendulums 38 and 42 on tilting of the scale base oppose each other although both tend to move in the same direction. The pendulum are arranged to exert equal forces on the beam pendulum 42 being adjustable for this purpose, thus holding the indicator 28 on zero and the scale beam parallel with the base in spite of tilting of the latter. The tilting of the scale beam in the present case does not affect the accuracy of weighing operation, of course, as the horizontal distances from the fulcrum 15 to the pans 16 and 17 still remain equal.

The chart 12 is provided with weight graduations to the left and right of the zero point indicating small amounts of over and under weight and the two pendulms 38 and 42 operate as auxiliary load offsetting mechanisms to counterbalance small degrees of over and under weight so that they may be indicated accurately by the indicator. It will be understood then that the bulk of the weight is counterbalanced by the even balance feature while slight deviations over and under are automatically counterbalanced by the pendulums.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim:

1. An even balance scale comprising a beam and an associated indicator provided with a pendulum operating upon said indicator tending to hold it in zero position when the scale is level, an under and over chart relative to the zero point of which said indicator is movable in either direction, and a second pendulum carried by the scale beam and compensating the effect of said first named pendulum when the scale is tilted.

2. An even balance scale comprising a beam having a pendulum attached thereto with its center of gravity vertically below its pivot, a pivoted indicator having a pendulum attached thereto with its center of gravity vertically below its pivot and a cross connection between said beam and said indicator.

3. An even balance scale comprising a pivoted beam with an attached pendulum having its center of gravity vertically below the beam pivot, a pivoted indicator with an attached pendulum having its center of gravity vertically below the indicator pivot, the axes of the beam and indicators lying in a common plane and link mechanism acting upon the beam at one side of its pivot and upon the indicator at the other side of its pivot whereby the actions of the two pendulums on the beam and indicator oppose each other when the scale is tilted.

4. An even balance scale comprising a pivoted balance beam with an associated indicator, a pair of pendulums connected with said beam through connections making both pendulums effective on a vertical line through the pivot of the beam, said pendulums being reversely connected to said beam whereby their effects are cumulative when the beam is out of balance and compensatory when the scale is tilted.

5. An even balance scale comprising a beam pivoted intermediate its ends, pans carried by the beam, on opposite sides of its pivot, an under-and-over chart, an indicator cooperating with the chart and movable in either direction from the zero point of the chart, an arm rigid with and extending laterally from the indicator, an arm associated with the beam, and a link connection pivoted to each of said arms to move the indicator upon movement of the beam.

6. An even balance scale comprising a beam, a pan on each end of the beam, an under-and-over chart, a pivoted indicator co-operating with the chart and movable in either direction from the zero point of the chart, a pair of arms on the indicator extending on opposite sides of its pivot, and a pair of arms associated with the beam and extending on opposite sides of the beam pivot, and link connections between the arms associated with the beam and the indicator arms whereby movement of the indicator is effected to correspond to movement of the beam.

7. An even balance scale comprising a beam, a pan associated therewith, an under-and-over chart, a substantially vertical indicator cooperating with the chart and movable in either direction from the zero point of the chart, a horizontally disposed arm provided on the indicator, a horizontally disposed arm associated with the beam, and a link connection pivoted to each of the arms to effect movement of the indicator in either direction from the zero point of the chart in accordance with movement of the pan.

8. An even balance scale comprising a beam, a pan associated therewith, an under-and-over chart, an indicator cooperating therewith and movable in either direction from the zero point of the chart, an arm associated with the beam and translatably movable in a vertical direction with the pan, an arm rigid with and extending laterally from the indicator, and a link pivoted to each of said arms for connecting the indicator and the beam for coordinated movement.

9. An even balance scale comprising a beam, a frame for rockably supporting the beam, a base housing rigid with said frame, a dash pot connected to the beam and located within the housing, a pendulum connected to the beam and substantially located within the base housing, an indicator associated with the beam, an under and over chart cooperating with the indicator, a chart housing extending upwardly from and rigid with said frame for enclosing said chart and indicator, and a second pendulum supported by the indicator for compensating the effect of the first pendulum when the scale is tilted.

10. An even balance scale comprising a pivoted balance beam with an associated under and over registering means, a pair of pendulums connected with said beam through connections making both pendulums effective on a vertical line through the pivot of the beam, said pendulums being reversely connected to said beam whereby their effects are cumulative when the beam is out of balance and compensatory when the scale is tilted.

11. An even balance scale such as defined in claim 10, said balance beam carrying a load support at each end and said registering means being associated with said beam through said supports.

In testimony whereof I hereto affix my signature.

WILLIAM N. GILBERT.